United States Patent
Suzuki

(10) Patent No.: US 11,320,283 B2
(45) Date of Patent: May 3, 2022

(54) ARRIVAL DETERMINATION SYSTEM AND ARRIVAL DETERMINATION PROGRAM

(71) Applicant: AISIN CORPORATION, Kariya (JP)

(72) Inventor: Ayumu Suzuki, Sapporo (JP)

(73) Assignee: AISIN CORPORATION, Kariya (JP)

( * ) Notice: Subject to any disclaimer, the term of this patent is extended or adjusted under 35 U.S.C. 154(b) by 181 days.

(21) Appl. No.: 16/751,865

(22) Filed: Jan. 24, 2020

(65) Prior Publication Data
US 2020/0264004 A1 Aug. 20, 2020

(30) Foreign Application Priority Data

Feb. 18, 2019 (JP) .............................. JP2019-026277
Sep. 27, 2019 (JP) .............................. JP2019-176719

(51) Int. Cl.
*G01C 21/36* (2006.01)
*G01C 21/34* (2006.01)

(52) U.S. Cl.
CPC .................................. *G01C 21/36* (2013.01)

(58) Field of Classification Search
USPC ........................................................ 701/527
See application file for complete search history.

(56) References Cited

U.S. PATENT DOCUMENTS

| | | | |
|---|---|---|---|
| 2004/0107048 A1* | 6/2004 | Yokota | G01C 21/34 701/431 |
| 2009/0227280 A1* | 9/2009 | Raab | H04W 48/18 455/550.1 |
| 2014/0019039 A1* | 1/2014 | Chowanic | G01C 21/3679 701/426 |
| 2014/0249742 A1* | 9/2014 | Krivacic | G08G 1/14 701/400 |
| 2014/0266810 A1* | 9/2014 | Hatton | G07C 5/008 340/989 |
| 2015/0123822 A1* | 5/2015 | Hatton | G08B 25/016 340/989 |
| 2018/0202822 A1* | 7/2018 | DeLizio | G06Q 30/0645 |
| 2019/0066520 A1* | 2/2019 | Schwartz | G08G 5/0021 |
| 2019/0342718 A1* | 11/2019 | Pylappan | G01S 19/48 |
| 2020/0264004 A1* | 8/2020 | Suzuki | G01C 21/36 |

FOREIGN PATENT DOCUMENTS

JP 2003-083756 A 3/2003

* cited by examiner

*Primary Examiner* — Tyler D Paige
(74) *Attorney, Agent, or Firm* — Oliff PLC

(57) ABSTRACT

Arrival determination systems and programs determine whether a vehicle is at a standstill; and determine that the vehicle has arrived at a destination when the vehicle is determined to be at a standstill and a present location of the vehicle is on the inner side of a road that surrounds the destination.

7 Claims, 3 Drawing Sheets

ARRIVAL DETERMINATION SYSTEM AND ARRIVAL DETERMINATION PROGRAM

INCORPORATION BY REFERENCE

The disclosure of Japanese Patent Application No. 2019-026277 filed on Feb. 18, 2019 and Japanese Patent Application No. 2019-176719 filed on Sep. 27, 2019, each including the specification, drawings and abstract, is incorporated herein by reference in its entirety.

BACKGROUND

The invention relates to an arrival determination system and an arrival determination program that detect that a vehicle has arrived at a destination.

DESCRIPTION OF THE RELATED ART

Hitherto, a process of determining whether a vehicle has arrived at a destination is performed in a navigation system and the like. For example, Japanese Unexamined Patent Application Publication No. 2003-83756 (JP 2003-83756 A) discloses a technique of determining, from position information of a vehicle, that the vehicle has arrived at a destination when the vehicle is within a determination area and a state in which a vehicle speed is equal to or less than a prescribed speed has continued for a prescribed period of time or more.

SUMMARY

In a related art, there were false determinations of a vehicle arriving at a destination. That is, a false determination is likely to occur when coordinates that are set as the destination and coordinates at which the vehicle has arrived at the destination (coordinates of a parking lot, for example) are different. In order to determine that a vehicle has arrived even when the coordinates that are set as the destination and the coordinates at which the vehicle has arrived at the destination are different, the determination area for determining an arrival to the destination needs to be sufficiently large. However, if the determination area is excessively large, a false determination is likely to occur, such as a determination that the vehicle has arrived at the destination when the vehicle is waiting at a traffic light on a road around the destination.

Specifically, with a destination having a large site such as a factory, it is difficult to accurately determine that the vehicle has arrived at the destination when the coordinates that are set as the destination and the parking lot in the site is far away. If information indicating a boundary of a site of a facility that is the destination is prepared beforehand, it is possible to determine that the vehicle has arrived at the destination when a present location is within the boundary. However, it is extremely difficult to prepare such information for all facilities that may become the destination.

The invention was developed in view of the above problem, and it is an object of the invention to improve the accuracy of destination arrival determination with a simple configuration.

In order to achieve the above object, arrival determination systems and programs determine whether a vehicle is at a standstill; and determine that the vehicle has arrived at a destination when the vehicle is determined to be at a standstill and a present location of the vehicle is on an inner side of a road that surrounds the destination.

That is, the destination is surrounded by a road. When the vehicle is at a standstill on the inner side of the road that surrounds the destination, the vehicle has either arrived at the destination or is extremely close to the destination. If the configuration is such that it is determined that the vehicle has arrived at the destination when the vehicle is at a standstill on the inner side of the road that surrounds the destination, it can be determined that the vehicle has arrived at the destination while there is a high possibility that the vehicle is in the facility that is the destination.

In order to achieve the above object, the arrival determination system may determine whether the vehicle is at a standstill; determine whether a line segment that connects the present location of the vehicle and the destination is in contact with the road; and determine that the vehicle has arrived at the destination when the vehicle is at a standstill and the line segment is not in contact with the road.

In order to achieve the above object, the arrival determination program may cause a computer to function as: a stop determination unit that determines whether a vehicle is at a standstill; a contact determination unit that determines whether a line segment that connects a present location of the vehicle and a destination is in contact with a road; and an arrival determination system that determines that the vehicle has arrived at the destination when the vehicle is determined to be at a standstill and the line segment is not in contact with the road.

That is, since there is no road that divides the vehicle and the destination when there is no road between the vehicle and the destination (coordinates that are set as the destination), there is a high possibility that the vehicle is in the facility that is the destination. With a configuration that determines that the vehicle has arrived at the destination when the vehicle is at a standstill and the line segment that connects the present location of the vehicle and the destination is not in contact with the road, it is possible to improve the accuracy of destination arrival determination with a simple configuration.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EXEMPLARY EMBODIMENTS

Hereinafter, embodiments will be described in the following order:

(1) Configuration of Navigation System:
(2) Arrival Determination Process:
(3) Other Embodiments:

(1) Configuration of Navigation System

Figure 1:
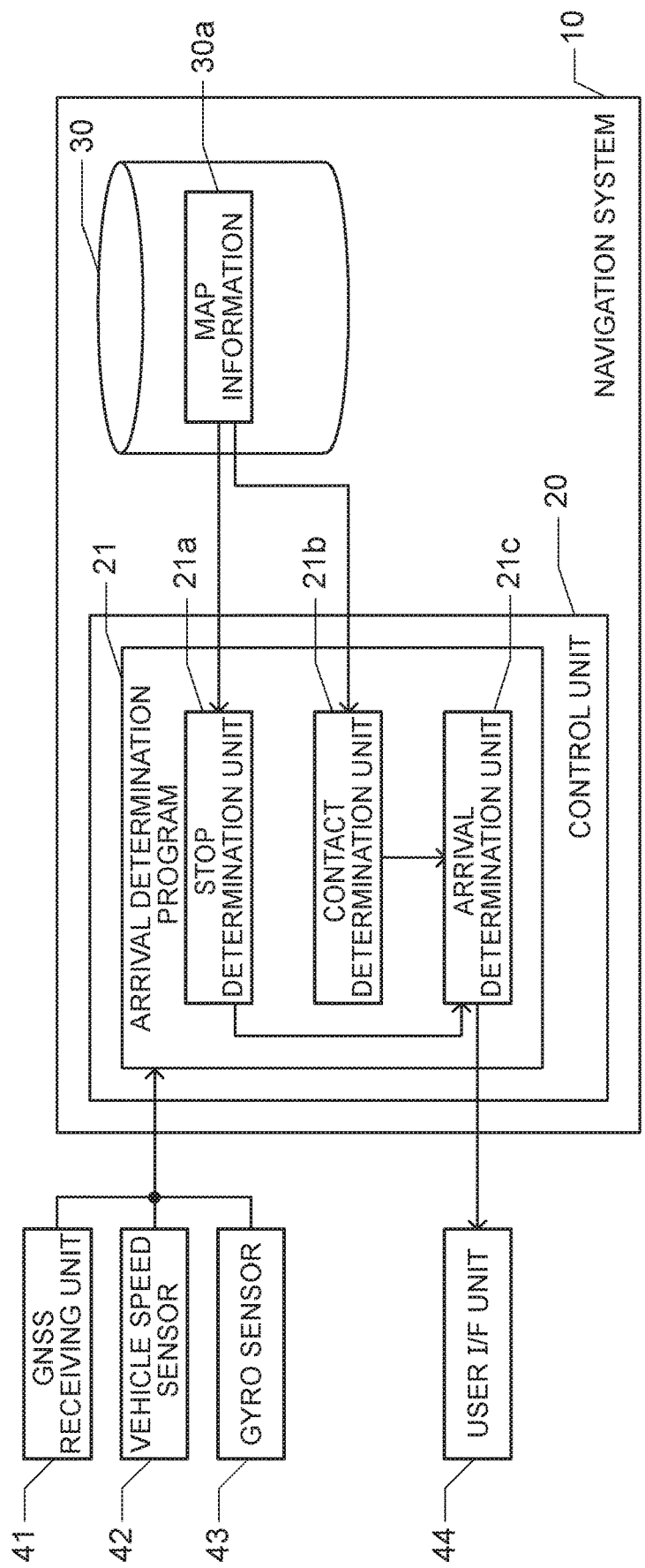
FIG. 1 is a block diagram of a navigation system including an arrival determination system.

FIG. 1 is a block diagram illustrating a configuration of a navigation system 10 including an arrival determination system. The navigation system 10 includes a control unit 20 that includes a central processing unit (CPU), a random access memory (RAM), a read-only memory (ROM), and so forth, and a recording medium 30. The control unit 20 can execute programs stored in the recording medium 30 and the ROM. As used herein, the term "recording medium" does not include transitory signals.

Map information 30a is recorded in the recording medium 30 beforehand. The map information 30a is information used for searching for a route and identifying a location of a vehicle. The map information 30a includes node data that indicate positions of nodes set on a road that a vehicle travels along, shape interpolation point data that indicate positions of shape interpolation points for specifying the shape of roads between nodes, link data that indicate connections between nodes, and feature data that indicate positions of features that are on or around roads etc. The features include facilities that may be a destination. Although information indicating a position of a facility is included in the feature data indicating the facility in the embodiment, information indicating an area of the facility (a polygon indicating a boundary of the facility etc.) is not included in the feature data (or there is information indicating an area of the facility only in some facility data).

In the embodiment, a link cost of a road section indicated by each link is associated with the link data. The link cost indicates a degree of the road section indicated by the link is likely to become a route, and the link cost may be decided with various methods and may be changed based on traffic information etc. In the embodiment, a road not stored in the map information 30a as the link data is treated as a road that is not there, in destination arrival determination. A road that is not included in the map information 30a as link data (a road within a facility for moving to a parking lot etc.) is thus not taken into consideration for destination arrival determination.

In the embodiment, a global navigation satellite system (GNSS) receiving unit 41, a vehicle speed sensor 42, a gyro sensor 43, and a user interface (I/F) unit 44 are provided in the vehicle. The GNSS receiving unit 41 is a device for receiving signals from a global navigation satellite system. The GNSS receiving unit 41 receives radio waves from navigation satellites and outputs signals for calculating a present location of the vehicle via an interface not shown. The control unit 20 acquires the signals to acquire the present location of the vehicle. The vehicle speed sensor 42 outputs signals corresponding to a rotational speed of wheels of the vehicle. The control unit 20 acquires the signals via an interface not shown and acquires the vehicle speed. The gyro sensor 43 detects an angular acceleration when the vehicle turns on a horizontal plane and outputs signals corresponding to a direction in which the vehicle is headed. The control unit 20 acquires the signals to acquire the traveling direction of the vehicle. The vehicle speed sensor 42 and the gyro sensor 43 etc. are used to identify a traveling path of the vehicle. In the embodiment, the present location is identified based on the departure point and the traveling path of the vehicle. The present location of the vehicle that is identified based on the departure point and the traveling path of the vehicle is corrected based on the output signals of the GNSS receiving unit 41.

The user I/F unit 44 is an interface for inputting a command of a user and providing various information to the user. The user I/F unit 44 has an input unit, a display unit (a touch panel display or a switch), and an output unit such as a speaker that are not shown.

In the embodiment, a navigation program not shown is included in a program that can be executed by the control unit 20. The control unit 20 acquires the present location of the vehicle by a process performed by the navigation program and acquires the destination based on a command of the user or a command of a distribution manager etc. The control unit 20 acquires a proposed travel route from the departure point to the destination and executes a function of guiding the user along the route. The navigation program has various program modules, which includes an arrival determination program 21 as one of them. The arrival determination program 21 has a function of determining whether the vehicle has arrived at the destination and the arrival determination program 21 is executed under the execution of the navigation program.

Figure 3A:
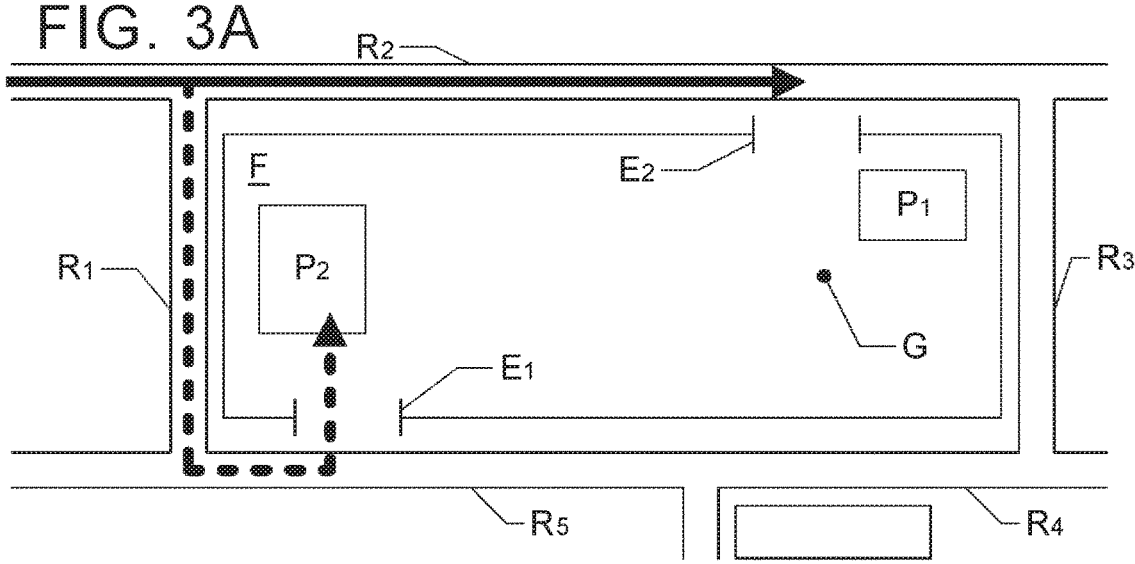
FIGS. 3A to 3C are diagrams for describing a vehicle arriving at a facility that is a destination.

FIG. 3A is a diagram illustrating an example of a facility F that is the destination and roads around the facility F. When the position of the facility F in the map information 30a is a position G and the facility F is the destination, the coordinates of the destination is the position G. However, since the road section within the facility F is not defined in the map information 30a, the road section that may become the proposed travel route is a road around the facility F. In the example illustrated in FIG. 3, there are two entrances $E_1$, $E_2$ in the facility F, and there are parking lots $P_1$, $P_2$ near the entrances $E_1$, $E_2$, respectively. When a search for a proposed travel route is performed, a proposed travel route to a position on the road that is closest to the position G that is a position of the facility F is searched. In FIG. 3A, the proposed travel route that is searched is indicated by a solid line arrow.

The navigation system 10 of the embodiment is a system in which a delivery route of a delivery agent is the proposed travel route, and the navigation system 10 is used for management such as collecting travel history to confirm whether a vehicle has traveled in accordance with the delivery route. The navigation system 10 of the embodiment thus does not search for the route again when guidance of the proposed travel route serving as the delivery route is being performed. That is, in a usual navigation system, if the vehicle is traveling along a road that is not the proposed travel route, the proposed travel route from the present location of the vehicle to the destination is searched again, and the proposed travel route that is searched again is indicated.

However, in the embodiment, when the vehicle deviates from the proposed travel route, a search is not performed again since the system collects information that unplanned traveling is carried out or notifies the user of unplanned traveling. In the example illustrated in FIG. 3A, a route of deviating from the proposed travel route and moving toward the facility F from the entrance $E_2$ is indicated by a broken line arrow. Even when the vehicle deviates from the initial proposed travel route, as in the route indicated by the broken line arrow, a search is not performed again.

In both cases of when the vehicle deviates from the proposed travel route and when the vehicle does not deviate from the proposed travel route, the destination is not changed when route guidance is being performed by the navigation system 10. When the vehicle arrives at the destination, the control unit 20 ends the route guidance. While route guidance is being performed, the control unit 20 performs destination arrival determination with the function of the arrival determination program 21. When the vehicle is traveling along the proposed travel route, the control unit 20 can perform destination arrival determination based on whether the present location of the vehicle has reached an end point, in addition to a positional relation between the present location of the vehicle and the destination. If the present location has reached the end point of the proposed travel route, it can be estimated that the present location has almost reached the destination. Thus, there is a high possibility that the destination arrival determination can be accurately performed by a determination that a distance between the present location and the destination is equal to or less than a threshold.

However, when the vehicle is not traveling along the proposed travel route, it is difficult to perform destination arrival determination based on the relationship between the present location and the proposed travel route. In the embodiment, the configuration is such that destination arrival determination can be accurately executed even when the vehicle is not traveling along the proposed travel route. The arrival determination program 21 has a stop determination unit 21a, a contact determination unit 21b, and an arrival determination unit 21c in order to perform such an arrival determination.

The stop determination unit 21a is a program module that causes the control unit 20 to execute a function of determining whether the vehicle is at a standstill. That is, the control unit 20 refers to the history of the present location of the vehicle that is acquired based on output signals of the GNSS receiving unit 41, the vehicle speed sensor 42, and the gyro sensor 43. The control unit 20 determines, based on the history, that the vehicle is at a standstill when it is determined that the vehicle is at a standstill (when the vehicle speed is equal to or less than a value at which the vehicle is assumed to be at a standstill).

The contact determination unit 21b is a program module that causes the control unit 20 to execute a function of determining whether a line segment that connects the present location of the vehicle and the destination is in contact with a road. In the embodiment, the control unit 20 performs the determination within a virtual space. Specifically, the control unit 20 of the embodiment performs processing in a virtual space that is for representing the position of a road in the map information 30a (for example, a space that is spanned by a latitude and a longitude).

That is, the control unit 20 acquires the present location of the vehicle that is acquired based on output signals of the GNSS receiving unit 41, the vehicle speed sensor 42, and the gyro sensor 43. The control unit 20 refers to the map information 30a and acquires the position of the facility that is the destination. The control unit 20 defines the line segment that connects the present location of the vehicle and the position of the facility within the virtual space described above. The control unit 20 refers to the map information 30a, specifies a position of a road section near the line segment, and determines whether the line segment is in contact with the road.

Figure 3B:
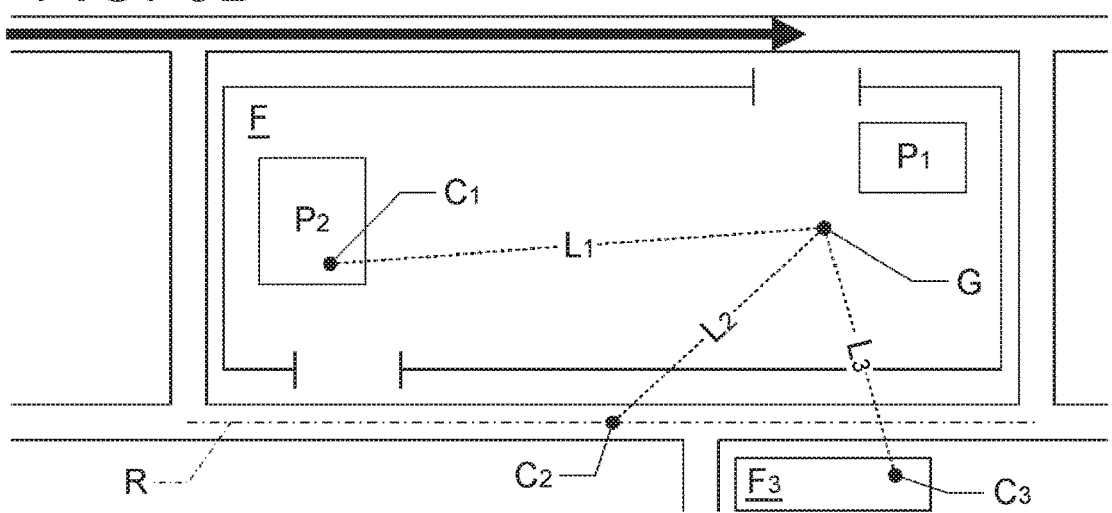

FIG. 3B is a diagram describing an example of when the present location of the vehicle is at positions $C_1$ to $C_3$ in the example illustrated in FIG. 3A. The position $C_1$ is the position of when the vehicle is at a standstill in a parking lot $P_2$ in the facility F. The position $C_2$ is the position of when the vehicle is at a standstill on a road section R indicated by a long dashed short dashed line while waiting at a traffic light etc. The position $C_3$ is the position of when the vehicle is at a standstill in a facility $F_3$ that is adjacent to the facility F. When the present location of the vehicle is the position $C_1$, the control unit 20 acquires a line segment with a distance $L_1$ that connects the position G of the facility F that is the destination and the position $C_1$. In the example illustrated in FIG. 3B, the map information 30a does not include link data indicating a road section between the position G and the position $C_1$. In this case, the control unit 20 does not determine that the line segment is in contact with the road.

When the present location of the vehicle is the position $C_2$, the control unit 20 acquires a line segment with a distance $L_2$ that connects the position G and the position $C_2$. In the example illustrated in FIG. 3B, the map information 30a includes link data indicating the road section R in which there is the position $C_2$. In this case, the control unit 20 determines that the line segment is in contact with the road. When the present location of the vehicle is the position $C_3$, the control unit 20 acquires a line segment with a distance $L_3$ that connects the position G and the position $C_3$. In the example illustrated in FIG. 3B, the map information 30a includes link data indicating the road section R between the position G and the position $C_3$. In this case, the control unit 20 determines that the line segment is in contact with the road.

The arrival determination unit 21c is a program module that causes the control unit 20 to execute a function of determining that the vehicle has arrived at the destination when the vehicle is at a standstill and the present location of the vehicle is on the inner side of the roads that surround the destination. In the embodiment, the control unit 20 determines that the vehicle has arrived at the destination when the vehicle is at a standstill and the line segment that connects the present location of the vehicle and the destination is not in contact with the road. That is, when the line segment that connects the present location of the vehicle and the destination is not in contact with the road, there is a high possibility that the present location of the vehicle is on the inner side of the roads that surround the destination. The control unit 20 thus determines that the vehicle has arrived at the destination when the vehicle is at a standstill and the line segment that connects the present location of the vehicle and the destination is not in contact with the road. However, in the embodiment, there is an exception to the determination. When the distance between the present location and the destination is larger than a threshold, the control unit 20 does not determine that the vehicle has arrived at the destination. The threshold is a value for determining whether the vehicle has approached the destination, and the threshold increases with the passage of time while the vehicle is at a standstill.

That is, in the embodiment, the threshold for determining that the present location has approached the destination is set beforehand so that it is not determined that the vehicle has arrived at the destination while the present location of the vehicle is excessively far from the destination. However, if the threshold is fixed, there is a possibility that it is not accurately determined that the vehicle arrived has arrived at the destination when a large site is set as the destination as illustrated in FIGS. 3A and 3B. The configuration is such that the threshold at an initial stage is set as a small value at which the present location can be assumed to have sufficiently approached the destination and the threshold gradually increases with the passage of time.

With this configuration, it is possible to recognize that the present location has approached the destination even when a large site is the destination, as illustrated in FIGS. 3A and 3B. When the distance between the present location and the destination is larger than the threshold, determination by the contact determination unit 21b does not have to be performed. With such a configuration, it is possible to prevent the line segment from being derived and prevent a process of determining contact between the line segment and the road from being performed when the present location of the vehicle is far from the destination and the vehicle has clearly not arrived at the destination.

In contrast, the control unit 20 determines that the vehicle has arrived at the destination when the distance between the present location and the destination is equal to or less than the threshold, the vehicle is at a standstill, and the line segment that connects the present location of the vehicle and the destination is not in contact with the road. That is, when the line segment that connects the present location of the vehicle and the destination is not in contact with the road, there is no road indicated by the map information 30a between the vehicle and the destination. Since there is no road that divides the vehicle and the destination, there is a high possibility that the vehicle is in the facility that is the destination. For example, when the line segment that connects the present location of the vehicle and the destination is not in contact with the road as in the case where the present location of the vehicle is the position $C_1$ illustrated in FIG. 3B, the vehicle has arrived at the facility F that is the destination. In the embodiment, the control unit 20 determines that the vehicle has arrived at the destination in this case.

In contrast, when the line segment that connects the present location of the vehicle and the destination is in contact with the road, the vehicle is on the road or there is the road indicated by the map information 30a between the vehicle and the destination. In this case, since the vehicle is traveling along the road or the facility F that is the destination and present location is divided by the road, there is a high possibility that the vehicle is not in the facility that is the destination. For example, when the line segment that connects the present location of the vehicle and the destination is in contact with the road as in the case where the present location of the vehicle is the position $C_2$ illustrated in FIG. 3B, there is a high possibility that the vehicle is traveling on a road around the destination. When the line segment that connects the present location of the vehicle and the destination intersects with the road as in the case where the present location of the vehicle is the position $C_3$ illustrated in FIG. 3B, there is a high possibility that the vehicle is in a facility other than the destination. The control unit 20 does not determine that the vehicle has arrived at the destination in these cases. With the above configuration, it is possible to improve the accuracy of destination arrival determination with a simple configuration.

(2) Arrival Determination Process

Figure 2:
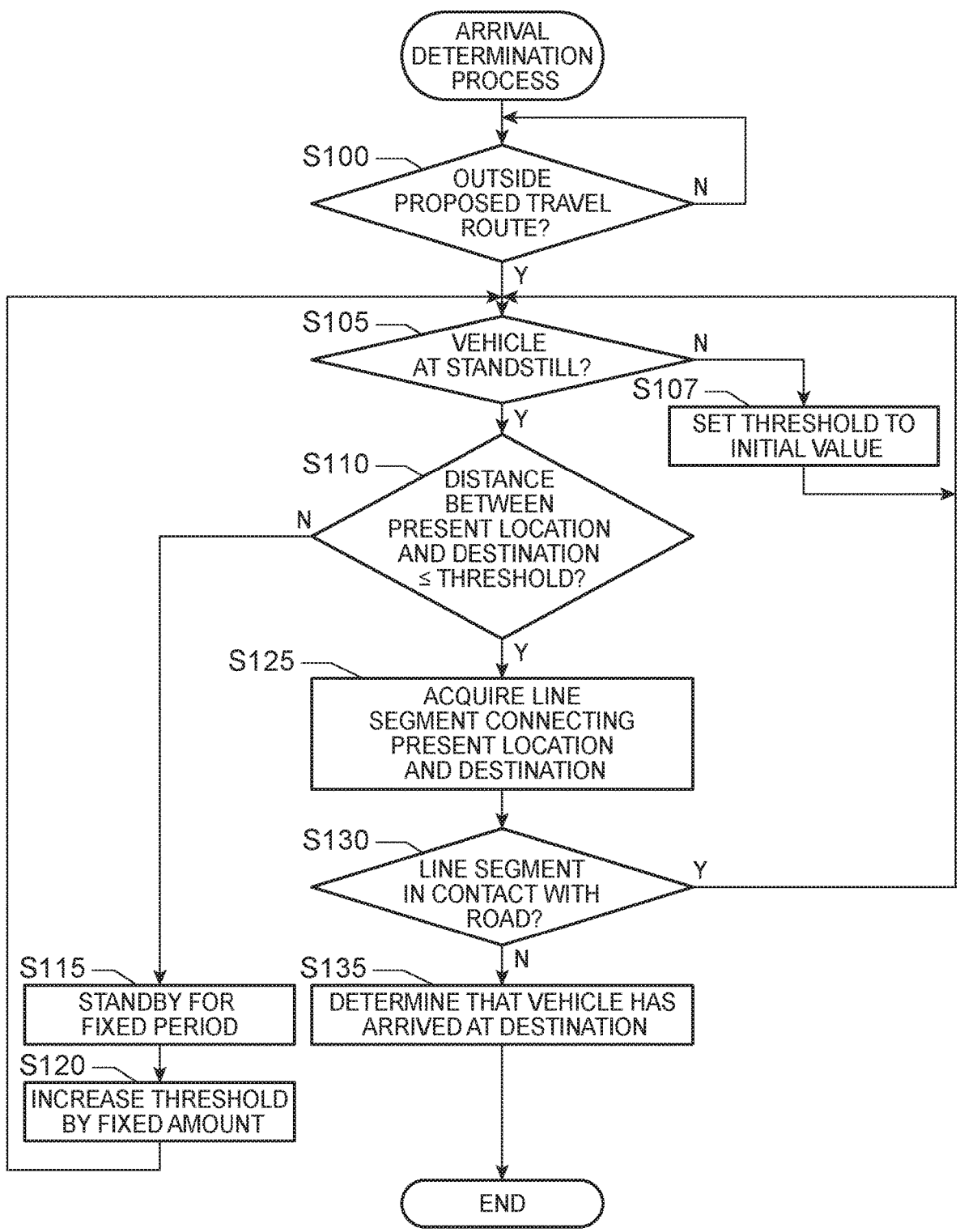
FIG. 2 is a flowchart illustrating an arrival determination process.

An arrival determination process performed by the arrival determination program 21 will be described. In the embodiment, when the user operates the user I/F unit 44, inputs the destination to search the proposed travel route, and starts guidance of the proposed travel route, the control unit 20 executes the arrival determination process illustrated in FIG. 2. When the arrival determination process starts, the control unit 20 determines whether the present location is outside the proposed travel route (step S100). That is, the control unit 20 acquires the present location of the vehicle based on output signals of the GNSS receiving unit 41, the vehicle speed sensor 42, and the gyro sensor 43. The control unit 20 refers to the map information 30a, and determines that the present location is outside the proposed travel route when the present location is not on the proposed travel route in which guidance is being performed.

In step S100, when it is not determined that the present location is outside the proposed travel route, the control unit 20 repeats the determination performed in step S100 every fixed period. Even when the vehicle is traveling along the proposed travel route, destination arrival determination is performed. For example, a configuration can be adopted in which the control unit 20 determines that the vehicle has arrived at the destination when the vehicle is traveling along the proposed travel route, if the vehicle reaches the vicinity of the terminal of the proposed travel route and the distance between the destination and the present location is equal to or less than a default value that is fixed.

In contrast, when the present location is determined to be outside the proposed travel route in step S100, the control unit 20 determines whether the vehicle is at a standstill with a function of the stop determination unit 21a (step S105). That is, the control unit 20 refers to the history of the present location of the vehicle that is acquired based on output signals of the GNSS receiving unit 41, the vehicle speed sensor 42, and the gyro sensor 43. The control unit 20 determines that the vehicle is at a standstill when the control unit 20 determines that the vehicle is at a standstill based on the change in the present location indicated by the history.

When it is not determined that the vehicle is at a standstill in step S105, the control unit 20 sets the threshold to the initial value (step S107) and repeats the determinations in and after step S105. That is, the control unit 20 is on standby until the vehicle is determined to be at a standstill. The initial value of the threshold is a fixed value that is set beforehand.

When the vehicle is determined to be at a standstill in step S105, the control unit 20 determines whether the distance between the present location and the destination is equal to or less than the threshold with the function of the arrival determination unit 21c (step S110). That is, the control unit 20 acquires the present location of the vehicle based on output signals of the GNSS receiving unit 41, the vehicle speed sensor 42, and the gyro sensor 43, and refers to the map information 30a to acquire the position of the destination. The control unit 20 acquires the distance between the present location of the vehicle and the destination and compares the distance with the threshold.

Figure 3C:
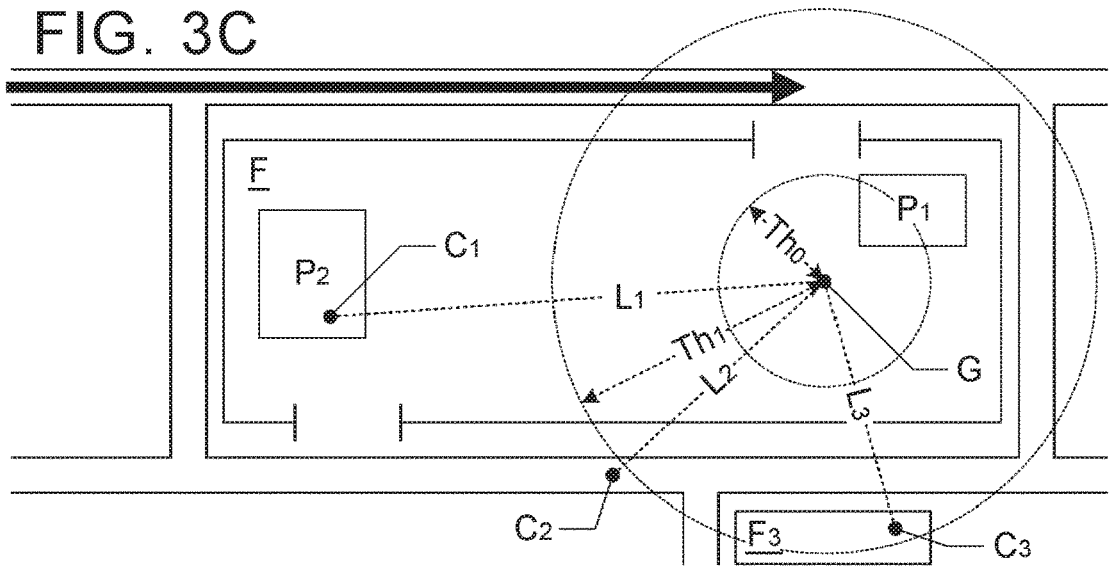

FIG. 3C illustrates a threshold in the same example as FIGS. 3A and 3B. The initial value of the threshold is a value $Th_0$. When step S110 is executed for the first time, the control unit 20 compares the value $Th_0$ and the distance between the present location of the vehicle and the destination. The initial value of the threshold is set to be a relatively small value so that it is possible to determine whether the present location has approached a relatively small facility. However, there is a case in which if the threshold is the value $Th_0$ when the facility F that is the destination is large, as in the example illustrated in FIG. 3C, the value $Th_0$ does not function as the threshold at which it is possible to determine that the vehicle has approached the facility F. In the example illustrated in FIG. 3C, the distances $L_1$ to $L_3$ between the destination and the present locations when the present locations of the vehicle are the positions $C_1$ to $C_3$, respectively, are all larger than the value $Th_0$. In this case, it is not determined that the distance between the present location and the destination is equal to or less than the threshold when step S110 is executed for the first time.

In the embodiment, the threshold is gradually increased. Specifically, when it is not determined that the distance between the present location and the destination is equal to or less than the threshold in step S110, the control unit 20 is on standby for a fixed period (step S115) and increases the threshold by a fixed amount (step S120) with the function of the arrival determination unit 21c. Here, the fixed period and the fixed amount only need to be set beforehand. For example, it is possible to adopt a configuration in which the fixed period and the fixed amount are set so that the range in which the distance between the present location and the destination is determined to be equal to or less than the threshold is changed enough while the vehicle is at a standstill because of a traffic light etc. When the process of increasing the threshold is performed, the control unit 20 repeats the process in and after step S105.

When the vehicle continues to be at a standstill at the same position, there is a case in which the distance between the present location and the destination is determined to be equal to or less than the threshold, in step S110. For example, in the example illustrated in FIG. 3C, it is determined that the distance between the present location and the destination is equal to or less than the threshold if the present location of the vehicle is at the position $C_3$ when the threshold increases to the value $Th_1$. It is determined in due time that the distance between the present location and the destination is equal to or less than the destination in step S110, if the vehicle continues to be at a standstill, even when the present location of the vehicle is at the position $C_1$ or when the present location of the vehicle is at the position $C_2$.

When it is determined that the distance between the present location and the destination is equal to or less than the threshold in step S110, the control unit 20 acquires the line segment that connects the present location and the destination with a function of the contact determination unit 21b (step S125). That is, the control unit 20 acquires the present location of the vehicle that is acquired based on output signals of the GNSS receiving unit 41, the vehicle speed sensor 42, and the gyro sensor 43. The control unit 20 refers to the map information 30a and acquires the position of the facility that is the destination. The control unit 20 defines the line segment that connects the present location of the vehicle and the position of the facility within the virtual space.

In the example illustrated in FIG. 3B, when the present location of the vehicle is the position $C_1$, the line segment with the distance $L_1$ that connects the position $C_1$ and the position G of the destination is acquired. When the present location of the vehicle is the position $C_2$, the line segment with the distance $L_2$ that connects the position $C_2$ and the position G of the destination is acquired. When the present location of the vehicle is the position $C_3$, the line segment with the distance $L_3$ that connects the position $C_3$ and the position G of the destination is acquired.

The control unit 20 then determines whether the line segment is in contact with the road with the function of the contact determination unit 21b (step S130). That is, the control unit 20 refers to the map information 30a, specifies a position of a road section around the line segment, and determines whether the line segment is in contact with the road. In the example illustrated in FIG. 3B, when the present location of the vehicle is the position $C_1$, it is not determined that the line segment that connects the position $C_1$ and the position G of the destination is in contact with the road section R. When the present location of the vehicle is the position $C_2$, it is determined that the line segment that connects the position $C_2$ and the position G of the destination is in contact with the road section R. When the present location of the vehicle is the position $C_3$, it is determined that the line segment that connects the position $C_3$ and the position G of the destination is in contact with the road section R.

When it is determined that the line segment is in contact with the road in step S130, the control unit 20 repeats the processes in and after step S105. That is, if the vehicle continues to be at a standstill, steps S105, S110, S125, and S130 are repeated, and it is not determined that the vehicle has arrived at the destination. When the vehicle starts moving, the threshold is initialized through the determination in step S105 and the control unit 20 is on standby until it is determined that the vehicle is at a standstill again.

When it is not determined that the line segment is in contact with the road in step S130, the control unit 20 determines that the vehicle has arrived at the destination (step S135). That is, the control unit 20 determines that the vehicle has arrived at the destination when it is determined that the distance between the present location and the destination is equal to or less than the threshold in step S125 and it is not determined that the line segment that connects the present location and the destination is in contact with the road in step S130 while the vehicle is at a standstill. For example, in the example illustrated in FIG. 3B, the threshold increases continuously in step S120 when the vehicle continues to be at a standstill at the position $C_1$. When the distance between the position $C_1$ and the position G of the destination becomes equal to or less than the threshold with the increase of the threshold, it is not determined that the line segment that connects the position $C_1$ and the position G of the destination is in contact with the road in step S130, since there is no road between the position $C_1$ and the position G of the destination. As a result, the control unit 20 determines that the vehicle has arrived at the destination.

(3) Other Embodiments

The embodiment described above is an example, and a variety of other embodiments can be adopted. For example, the arrival determination system may be a device mounted on a vehicle etc., a device that is implemented by a portable terminal, or a system that is implemented by a plurality of devices (such as a client and server, a control unit in a navigation device and a control unit in a user I/F unit).

At least a part of the stop determination unit 21a, the contact determination unit 21b, and the arrival determination unit 21c that configure the arrival determination system may be provided separately in a plurality of devices. A part of the configuration of the embodiment described above may be omitted, the order of the processing may be changed, or some of the processing may be omitted. For example, in the arrival determination process of the embodiment described above, the processes in and after step S105 are executed when the vehicle deviates from the proposed travel route. However, the processes in and after step S105 may be executed regardless of whether the vehicle deviates from the proposed travel route.

In the embodiment described above, it is determined that the vehicle has arrived at the destination when the vehicle is at a standstill, the distance between the present location and the destination is equal to or less than the threshold, and the line segment that connects the present location and the destination is not in contact with the road. However, a part of the conditions may be omitted. For example, the configuration may be such that the condition that the distance between the present location and the destination is equal to or less than the threshold is omitted, and it is determined that the vehicle has arrived at the destination when the vehicle is at a standstill and the line segment that connects the present location and the destination is not in contact with the road. In a configuration in which the condition that the distance between the present location and the destination is equal to or less than the threshold is taken into consideration, the threshold may be a fixed value. In such a case, it is preferable that the threshold be set so that, in many facilities, the distance between the present location of the vehicle, which is parked within the facility, is equal to or less than the threshold, thereby it is assumed that the vehicle has arrived at the destination even when the vehicle arrives at a large facility.

The stop determination unit has only to be capable of determining whether the vehicle is at a standstill. That is, the stop determination unit has only to be capable of determining whether the vehicle is at a standstill. As in the embodiment described above, whether the vehicle is at a standstill may be determined based on a change of the present location with time, or may be determined based on other elements such as the vehicle speed, and various configurations can be adopted.

The contact determination unit has only to be capable of determining whether the line segment that connects the present location of the vehicle and the destination is in contact with the road. That is, the contact determination unit can specify the present location of the vehicle, the destination, and the position of the road within a virtual space such as a space for drawing a map. The contact determination unit has only to be capable of defining the line segment that connects the present location of the vehicle and the destination in the space and specifying the positional relationship between the line segment and the road. The case in which the line segment is in contact with the road includes a case in which the line segment intersects with the road and a case in which the line segment is in contact with the road.

The road that is to be determined whether it is in contact with the line segment may be limited. For example, the road that is to be determined whether it is in contact with the line segment may be limited to a road that may become a route of the vehicle. That is, when the road that may become the route of the vehicle is between the present location of the vehicle and the destination, the road can be used to approach the destination. It is thus assumed that the vehicle has not arrived at the destination.

The road that may be become the route of the vehicle may be various roads, and all roads indicated by the map information 30a may be the road that may become the route, or some roads may be a road that does not become the route. An example of the latter includes a configuration in which a road of a specific attribute indicated by the map information 30a (such as a narrow street) does not become the route.

The road that is to be determined whether it is in contact with the line segment may include or not include a road that the vehicle is on. If the road that the vehicle is on is included, it is not determined that the vehicle has arrived at the destination while the vehicle is traveling on the road. If the road that the vehicle is on is not included, it is possible to prevent the occurrence of determination that the vehicle has not arrived at the destination due to the road, when the vehicle is on the road with the vehicle having arrived at the destination.

The arrival determination unit has only to be capable of determining that the vehicle has arrived at the destination when the vehicle is at a standstill and the present location of the vehicle is on the inner side of the roads that surround the destination. Determination of whether the present location of the vehicle is on the inner side of the roads that surround the destination is not limited to the configuration that is indirectly executed depending on whether the line segment is in contact with the roads. For example, in the configuration described above that is illustrated in FIG. 1, the contact determination unit 21b may be omitted, and determination of whether the vehicle has arrived at the destination may be performed based on the determination by the stop determination unit 21a and the determination by the arrival determination unit 21c that refers to the map information 30a.

More specifically, the control unit 20 refers to the map information 30a and specifies the destination, acquires the roads that surround the destination, and specifies the roads that surround the destination. The control unit 20 determines that the vehicle has arrived at the destination when the present location of the vehicle that is at a standstill, is surrounded by the roads. For example, in the example illustrated in FIG. 3A, there are roads $R_1$ to $R_5$ around the facility F including the position G. Since the positions of the roads are included in the map information 30a, the control unit 20 can acquire the roads $R_1$ to $R_5$ surrounding the position G based on the map information 30a when the position G is set as the destination. If the present location of the vehicle, which is at a standstill, is surrounded by the roads $R_1$ to $R_5$, the vehicle is at a standstill in the facility F and the control unit 20 determines that the vehicle has arrived at the destination. Even with such a configuration, it is possible to improve the accuracy of destination arrival determination with a simple configuration. In most cases, the roads that surround the destination are roads with the smallest sum of distances among the closed roads that surround the destination. However, when there is an entrance of the facility at the end of the road etc., there may be a part that is not closed among the roads that surround the destination.

The method of determining that the vehicle has arrived at the destination when the line segment that connects the present location of the vehicle and the destination is not in contact with the road can be applied as a program and a method. There are cases in which the system, the program, and the method stated above are implemented as an independent device or are implemented using parts in common with sections provided in the vehicle. The system, the program, and the method stated above include various forms. For example, a navigation system, method, and program that include the system described above can be provided. Various changes may also be made. For example, some units may be implemented using software, and some units may be implemented using hardware. Further, implementations include a recording medium for a program that controls the system. The recording medium of the software may be a magnetic recording medium or a semiconductor memory. The same applies to any recording medium that will be developed in the future.

What is claimed is:

1. A vehicle arrival determination system comprising:
a display;
an interface for communicating with a global navigation satellite system (GNSS) receiver; and
a processor programmed to:
    access, via the interface, location information for a vehicle that is obtained by the GNSS receiver and indicates a present location of the vehicle;
    based on the accessed location information:
        determine whether the vehicle is at a standstill;
        determine whether the present location of the vehicle is located on a road;
        determine whether there is a road between the present location of the vehicle and a destination;
        determine that the vehicle has arrived at the destination when (i) the vehicle is determined to be at a standstill, (ii) the present location of the vehicle is determined to not be located on a road, and (iii) it is determined that there is no road between the present location of the vehicle and the destination; and output a notification on at least one of the display and a speaker indicating that the vehicle has arrived at the destination.

2. The arrival determination system according claim 1, wherein the processor is programmed to:
determine whether a line segment that connects the present location and the destination is in contact with any road; and
assume that there is no road between the present location of the vehicle and the destination when the line segment is not determined to be in contact with any road.

3. The arrival determination system according to claim 1, wherein the processor is programmed to determine that the vehicle has not arrived at the destination when a distance between the present location and the destination is larger than a threshold.

4. The arrival determination system according to claim 3, wherein the threshold increases as time passes while the vehicle is at a standstill.

5. The arrival determination system according to claim 2, wherein the processor is programmed to determine that the vehicle has not arrived at the destination when a distance between the present location and the destination is larger than a threshold.

6. The arrival determination system according to claim 5, wherein the threshold increases as time passes while the vehicle is at a standstill.

7. A computer-readable recording medium storing a computer-executable vehicle arrival determination program that causes a computer to perform functions comprising:
accessing, via an interface, location information for a vehicle that is obtained by a GNSS receiver and indicates a present location of the vehicle;
based on the accessed location information:
determining whether the vehicle is at a standstill;
determining whether the present location of the vehicle is located on a road;
determining whether there is a road between the present location of the vehicle and a destination;
determining that the vehicle has arrived at the destination when (i) the vehicle is determined to be at a standstill, (ii) the present location of the vehicle is determined to not be located on a road, and (iii) it is determined that there is no road between the present location of the vehicle and the destination; and
outputting a notification on at least one of a display and a speaker indicating that the vehicle has arrived at the destination.

* * * * *